United States Patent
Ikeda et al.

(10) Patent No.: US 12,145,844 B2
(45) Date of Patent: Nov. 19, 2024

(54) HEXAGONAL BORON NITRIDE POWDER, RESIN COMPOSITION, RESIN SHEET, AND METHOD FOR PRODUCING HEXAGONAL BORON NITRIDE POWDER

(71) Applicants: TOKUYAMA CORPORATION, Yamaguchi (JP); SHINSHU UNIVERSITY, Nagano (JP)

(72) Inventors: Yuichi Ikeda, Yamaguchi (JP); Shota Daiki, Yamaguchi (JP); Kyoichi Fujinami, Yamaguchi (JP); Teruhiko Nawata, Yamaguchi (JP); Katsuya Teshima, Nagano (JP); Tetsuya Yamada, Nagano (JP)

(73) Assignees: TOKUYAMA CORPORATION, Yamaguchi (JP); SHINSHU UNIVERSITY, Nagano (JP)

( * ) Notice: Subject to any disclaimer, the term of this patent is extended or adjusted under 35 U.S.C. 154(b) by 579 days.

(21) Appl. No.: 17/312,567

(22) PCT Filed: Feb. 28, 2020

(86) PCT No.: PCT/JP2020/008288
§ 371 (c)(1),
(2) Date: Jun. 10, 2021

(87) PCT Pub. No.: WO2020/179662
PCT Pub. Date: Sep. 10, 2020

(65) Prior Publication Data
US 2022/0041445 A1    Feb. 10, 2022

(30) Foreign Application Priority Data

Mar. 1, 2019  (JP) ................................. 2019-037541
Sep. 17, 2019  (JP) ................................. 2019-168462

(51) Int. Cl.
*C01B 21/064* (2006.01)
*C08K 3/38* (2006.01)
*C08L 101/00* (2006.01)

(52) U.S. Cl.
CPC .............. *C01B 21/064* (2013.01); *C08K 3/38* (2013.01); *C08L 101/00* (2013.01); *C01P 2002/74* (2013.01); *C01P 2004/51* (2013.01); *C01P 2004/61* (2013.01); *C01P 2006/11* (2013.01); *C01P 2006/12* (2013.01); *C08K 2201/003* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | | |
|---|---|---|---|
| 5,898,009 A * | 4/1999 | Shaffer | C01B 21/0648 501/96.4 |
| 6,319,602 B1 | 11/2001 | Fauzi et al. | |
| 2002/0076557 A1 | 6/2002 | Fauzi et al. | |
| 2006/0140838 A1 | 6/2006 | Pultz, Jr. et al. | |
| 2010/0226095 A1 | 9/2010 | Mimura et al. | |
| 2011/0027565 A1* | 2/2011 | Matsumoto | C09K 5/14 428/220 |
| 2016/0060112 A1 | 3/2016 | Nishi et al. | |
| 2017/0008767 A1 | 1/2017 | Kurokawa et al. | |
| 2018/0201818 A1* | 7/2018 | Otsuka | C01B 21/0645 |
| 2018/0354792 A1 | 12/2018 | Otsuka et al. | |
| 2019/0352180 A1 | 11/2019 | Daiki et al. | |

FOREIGN PATENT DOCUMENTS

| | | |
|---|---|---|
| CN | 105026312 A | 11/2015 |
| JP | 10-059702 | 3/1998 |
| JP | 2006-188411 | 7/2006 |
| JP | 2010-076956 | 4/2010 |
| JP | 2016-141600 | 8/2016 |
| JP | 2018-165241 | 10/2018 |
| JP | 2019-182737 | 10/2019 |
| WO | 2009/041300 | 4/2009 |
| WO | 2015/122378 | 8/2015 |
| WO | 2017/145869 | 8/2017 |
| WO | 2018/123571 | 7/2018 |

OTHER PUBLICATIONS

Brookhaven Instruments. Applications. chrome-extension://efaidnbmnnnibpcajpcglclefindmkaj/https://www.brookhaveninstruments.com/wp-content/uploads/2019/11/what-is-a-continuous-particle-size-distribution-brookhaven-instruments.pdf 2024 (Year: 2024).*
Harmonization. Stage 6. Bulk Density and Tapped Density of Powders. Aug. 1, 2015 (Year: 2015).*
Office Action For CN Patent Application No. 202080006815.4, mailed Feb. 24, 2023, 7 pages.
International Search Report of PCT/JP2020/008288, mailed Apr. 28, 2020, 2 pages.
English Translation of the Written Opinion of the International Searching Authority of PCT/JP2020/008288, mailed Apr. 28, 2020, 10 pages.

* cited by examiner

*Primary Examiner* — Sheng H Davis
(74) *Attorney, Agent, or Firm* — Casimir Jones, S.C.; Robert A. Goetz

(57) ABSTRACT

It is an object to achieve a resin sheet having high thermal conductance and high dielectric strength. Hexagonal boron nitride powder in accordance with an aspect of the present invention includes hexagonal boron nitride agglomerate particles each including agglomerated hexagonal boron nitride primary particles, and has a specific surface area of not less than 0.5 m²/g and not more than 5.0 m²/g. The hexagonal boron nitride primary particles each have a long diameter of not less than 0.6 μm and not more than 4.0 μm and an aspect ratio of not less than 1.5 and not more than 5.0.

4 Claims, 4 Drawing Sheets

HEXAGONAL BORON NITRIDE POWDER, RESIN COMPOSITION, RESIN SHEET, AND METHOD FOR PRODUCING HEXAGONAL BORON NITRIDE POWDER

TECHNICAL FIELD

The present invention relates to hexagonal boron nitride powder, a resin composition, a resin sheet, and a method for producing hexagonal boron nitride powder.

BACKGROUND ART

Hexagonal boron nitride is used as a material having dielectric strength and thermal conductance in electronic components. As a method for producing a hexagonal boron nitride single crystal, known is, for example, the flux method disclosed in Patent Literature 1. Further, as methods for producing hexagonal boron nitride powder, known as related arts are, for example, the melamine methods disclosed in Patent Literatures 2 and 3, and the gas phase method disclosed in Patent Literature 4.

CITATION LIST

Patent Literature

[Patent Literature 1]
Japanese Patent Application Publication Tokukai No. 2016-141600
[Patent Literature 2]
Japanese Patent Application Publication Tokukaihei No. 10-059702
[Patent Literature 3]
Japanese Patent Application Publication Tokukai No. 2006-188411
[Patent Literature 4]
International Publication No. WO 2015/122378

SUMMARY OF INVENTION

Technical Problem

However, the related arts as described above have a room for improvement in terms of achieving a resin sheet exhibiting high thermal conductance and high dielectric strength. It is an object of an aspect of the present invention is to provide hexagonal boron nitride powder which can achieve a resin sheet having high thermal conductance and high dielectric strength.

Solution to Problem

The inventors of the present invention studied diligently to solve the above problem and found that a resin sheet having high thermal conductance and high dielectric strength is able to be produced by using powder including agglomerate particles each including agglomerated hexagonal boron nitride primary particles of a specific shape. The present invention includes the following.

Hexagonal boron nitride powder, including hexagonal boron nitride agglomerate particles each including agglomerated hexagonal boron nitride primary particles, the hexagonal boron nitride powder having a specific surface area of not less than 0.5 m$^2$/g and not more than 5.0 m$^2$/g, and the hexagonal boron nitride primary particles each having a long diameter of not less than 0.6 μm and not more than 4.0 μm and an aspect ratio of not less than 1.5 and not more than 5.0.

A method for producing hexagonal boron nitride powder, the method including a heating step of heating mixed powder including an oxide of boron, a nitrogen-containing organic compound, and lithium carbonate, a weight ratio of boron atoms to nitrogen atoms in the mixed powder being not less than 0.2 and not more than 0.4, a weight ratio of boron atoms to lithium carbonate in the mixed powder being not less than 0.22 and not more than 0.98, and the mixed powder being heated at a maximum temperature of not less than 1200° C. and not more than 1500° C. in the heating step.

Advantageous Effects of Invention

According to an aspect of the present invention, it is possible to provide hexagonal boron nitride powder which can achieve a resin sheet having high thermal conductance and high dielectric strength.

DESCRIPTION OF EMBODIMENTS

Figure 1:
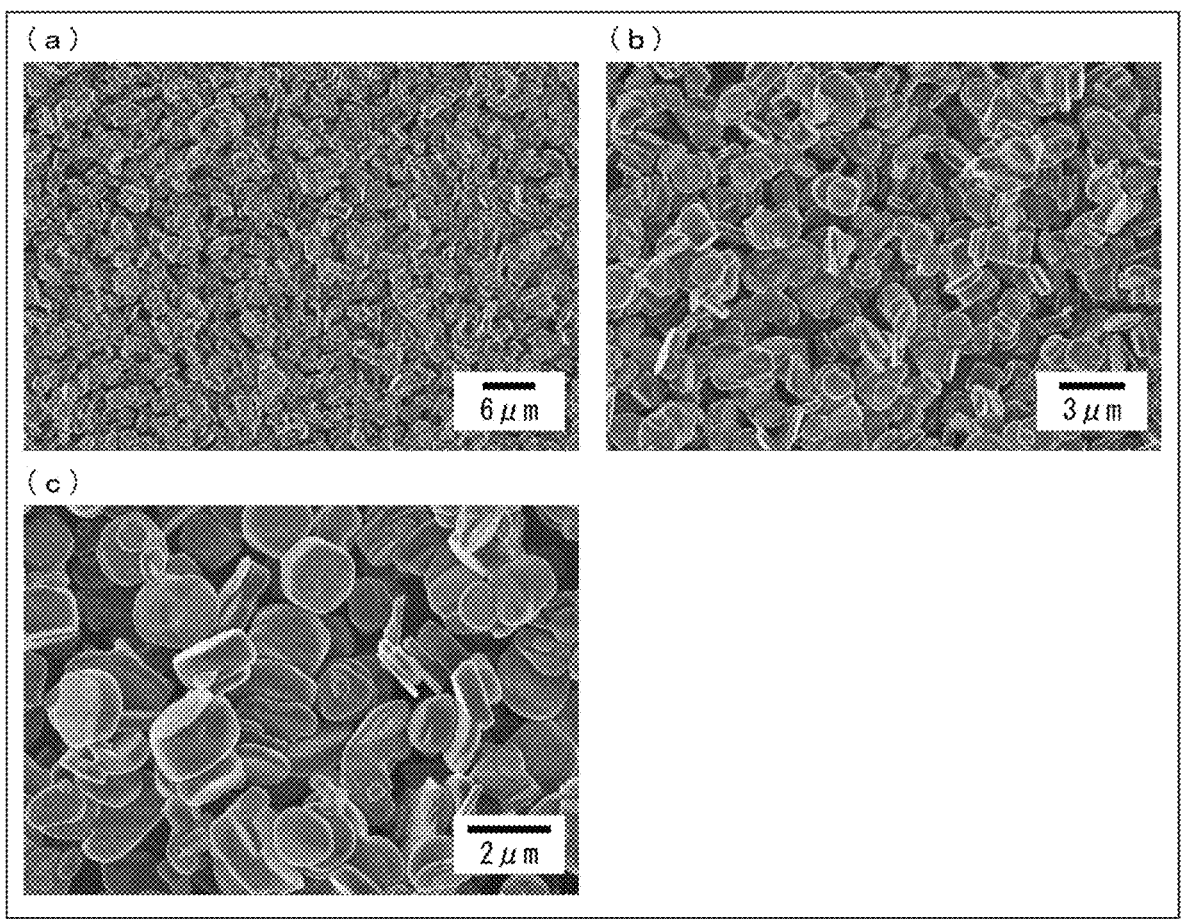
FIG. 1 is a view illustrating a scanning electron microscope image of hexagonal boron nitride powder in accordance with Example 1, in which (a) of FIG. 1 is a view of an image captured at a magnification of 2000, (b) of FIG. 1 is a view of an image captured at a magnification of 5000, and (c) of FIG. 1 is a view of an image captured at a magnification of 10000.

Although the following description will discuss embodiments of the present invention, the present invention is not limited to the embodiments.

<1. Hexagonal Boron Nitride Powder>

Hexagonal boron nitride powder in accordance with an embodiment of the present invention includes hexagonal boron nitride agglomerate particles each including agglomerated hexagonal boron nitride primary particles, and has a specific surface area of not less than 0.5 m$^2$/g and not more than 5.0 m$^2$/g. The hexagonal boron nitride primary particles each have a long diameter of not less than 0.6 μm and not more than 4.0 μm and an aspect ratio of not less than 1.5 and not more than 5.0.

The hexagonal boron nitride powder includes hexagonal boron nitride agglomerate particles each formed by dense agglomeration of hexagonal boron nitride primary particles, and each having a small particle diameter and a shape of a thick plate. Accordingly, a resin sheet produced using the hexagonal boron nitride powder has improved anisotropy. Further, such a resin sheet exhibits high thermal conductance and high dielectric strength since the resin sheet is densely filled with hexagonal boron nitride powder.

Since the hexagonal boron nitride powder contains a small amount of fines, it is possible to effectively prevent an increase in viscosity when a resin is kneaded with the hexagonal boron nitride powder. This enables the hexagonal boron nitride powder to have an excellent resin-filling property. Consequently, a resin sheet produced using the hexagonal boron nitride powder additionally exhibits high thermal conductance and high dielectric strength.

As used herein, a hexagonal boron nitride primary particle means a single particle of hexagonal boron nitride. Hereinafter, a hexagonal boron nitride primary particle is also referred to as an h-BN primary particle. The h-BN primary particle is typically a plate-shaped particle. In this specification, a diameter largest in the plate face of the plate-shaped particle is referred to as a long diameter. A length perpendicular to the plate face is referred to as a thickness. A value obtained by dividing the long diameter by the thickness is referred to as an aspect ratio.

The long diameter of the h-BN primary particle is preferably not less than 0.6 μm and not more than 4.0 μm, more preferably not less than 1.0 μm and not more than 3.5 μm, and still more preferably not less than 1.5 μm and not more than 3.5 μm. The aspect ratio of the h-BN primary particle is preferably not less than 1.5 and not more than 5.0, more preferably not less than 2.0 and not more than 4.5, and still more preferably not less than 2.5 and not more than 4.0. The long diameter and the aspect ratio of the h-BN primary particle falling within the above respective ranges indicate the h-BN primary particle has a small particle diameter and has a shape of a thick plate. Further, the long diameter and the aspect ratio of the h-BN primary particle falling within the above respective ranges make the resultant agglomerate particle substantially spherical. This is less likely to leave space in the agglomerate particle and enables prevention of an increase in the viscosity of the resin composition. As used herein, the long diameter and the aspect ratio of the h-BN primary particle refer to respective average values as measured via the measuring method described in Examples below.

As used herein, the hexagonal boron nitride agglomerate particle means a particle including agglomerated h-BN primary particles. The hexagonal boron nitride agglomerate particle typically has a long diameter of 5 μm to 40 μm. Hereinafter, the hexagonal boron nitride agglomerate particle is also referred to as an h-BN agglomerate particle. The h-BN agglomerate particle has shapes illustrated in FIG. 1 and FIG. 2. For example, the h-BN agglomerate particle has a substantially spherical shape formed by at least two h-BN primary particles connected with each other in the thickness direction, a shape formed by the substantially spherical particles strung together like beads, or a shape formed by the h-BN primary particles of different sizes agglomerated so as to face in different directions.

The hexagonal boron nitride powder includes the h-BN agglomerate particles. Hereinafter, the hexagonal boron nitride powder is also referred to as an h-BN powder. The h-BN powder further may include h-BN primary particles. In other words, the h-BN powder can be a mixture of the h-BN primary particles and the h-BN agglomerate particles.

A specific surface area of the h-BN powder is preferably not less than 0.5 m$^2$/g and not more than 5.0 m$^2$/g, more preferably not less than 1.0 m$^2$/g and not more than 4.5 m$^2$/g, and still more preferably not less than 1.5 m$^2$/g and not more than 4.0 m$^2$/g. In a case where the h-BN primary particle has a relatively large thickness, the specific surface area of the h-BN powder tends to fall within the above range. Further, h-BN powder having a specific surface area of not less than 0.5 m$^2$/g indicates that relatively small h-BN primary particles are moderately agglomerated in the h-BN powder. Consequently, a resin sheet produced using the h-BN powder in accordance with an embodiment of the present invention has improved anisotropy and good thermal conductance.

The h-BN powder having a specific surface area of not more than 5.0 m$^2$/g indicates that the h-BN powder contains a small amount of fines and a large amount of h-BN primary particles having a large thickness. A small amount of fines contained in the h-BN powder prevents an increase in viscosity of a resin composition obtained by kneading a resin with the h-BN powder. This facilitates filling the resin with the h-BN powder. Consequently, a resin sheet produced using the h-BN powder in accordance with an embodiment of the present invention exhibits good thermal conductance and good dielectric strength.

A tapped bulk density of the h-BN powder in accordance with an embodiment of the present invention is preferably not less than 0.40 g/cm$^3$, more preferably not less than 0.45 g/cm$^3$, and still more preferably not less than 0.50 g/cm$^3$. The tapped bulk density being not less than 0.40 g/cm$^3$ indicates that h-BN primary particles having a specific shape are moderately agglomerated and that h-BN powder is formed having a particle size distribution which provides a high filling property. In other words, in a case where the tapped bulk density is not less than 0.40 g/cm$^3$, the h-BN agglomerate particle is not sparse, and/or the h-BN agglomerate particle has a good resin composition-filling property. Consequently, a resin sheet produced using the h-BN powder in accordance with an embodiment of the present invention is less likely to have voids, and exhibits a uniform thermal conductance. Note that the particle size distribution which provides a high filling property indicates that the h-BN primary particles and the h-BN agglomerate particles having various particle diameters are moderately contained. For example, in a case where the h-BN powder contains only the h-BN primary particles having a single particle diameter or the h-BN agglomerate particles having a single particle diameter, voids are likely to be left between the h-BN primary particles or the h-BN agglomerate particles. Therefore, it is difficult to densely fill a resin composition with the h-BN agglomerate particles.

A D95 of the h-BN powder in accordance with an embodiment of the present invention is preferably 5 μm to 15 μm, more preferably 5 μm to 12 μm, and still more preferably 5 μm to 10 μm. The D95 indicates a particle diameter for a cumulative volume frequency of 95% on the particle size distribution curve. In a case where the h-BN powder in accordance with an embodiment of the present invention has a D95 of not more than 15 μm, the h-BN powder does not contain particles with a large particle diameter. Accordingly, even in a case where a thin resin sheet is formed using such h-BN powder, surface smoothness of the resin sheet is obtained. In other words, using the h-BN powder in accordance with an embodiment of the present invention facilitates producing a thin resin sheet. Further, it is understood that in a case where the h-BN powder has a D95 of not less than 5 μm, which is not less than the average particle diameter of the h-BN primary particles, the h-BN primary particles are not monodispersed and are sufficiently agglomerated.

A D10 of the h-BN powder in accordance with an embodiment of the present invention is preferably not less than 1.5 μm, more preferably not less than 1.8 μm, and still more preferably not less than 2.0 μm. Note that the D10 refers to a particle diameter for a cumulative volume frequency of 10% on a particle size distribution curve. The h-BN powder having a D10 of not less than 1.5 μm indicates that the amount of fines contained in the h-BN powder is low.

A resin viscosity for a resin filled with the h-BN powder (filled resin viscosity) is preferably relatively low. For example, in a case where a silicone resin (CY52-276A available from Dow Toray Co., Ltd.) is filled with 20% by volume of the h-BN powder, the filled resin viscosity is preferably not more than 130 Pa·S, and more preferably not more than 125 Pa·S. The filled resin viscosity being not more than 130 Pa·S allows a resin to be densely filled with the h-BN powder. Further, such a filled resin viscosity results in a good fluidity of resin, and thus makes it possible to facilitate producing a resin sheet.

A DBP absorption (mL/100 g) of the h-BN powder which is calculated from a curve obtained from a horizontal axis: a DBP drip amount (mL) and a vertical axis: a torque (Nm) as measured in conformity to JIS-K-6217-4 is preferably not more than 70 mL/100 g, more preferably not more than 65 mL/100 g, and still more preferably not more than 60 mL/100 g. The h-BN powder having a DBP absorption of not more than 70 mL/100 g more successfully prevents an increase in filled resin viscosity than the h-BN powder having a DBP absorption of more than 70 mL/100 g, when the specific surface area is equal to each other.

<2. Resin Composition>

A resin composition in accordance with an embodiment of the present invention includes the above h-BN powder and a resin. The method for producing the resin composition is not limited to a particular method, and the resin composition can be produced by a known preparation method.

(2-1. Resin)

The resin is not limited to a particular resin, and may be, for example, a silicone-based resin or an epoxy-based resin. Examples of the epoxy resin may include a bisphenol A type epoxy resin, a bisphenol S type epoxy resin, a bisphenol F type epoxy resin, a hydrogenated bisphenol A type epoxy resin, a polypropylene glycol type epoxy resin, a polytetramethylene glycol type epoxy resin, a naphthalene type epoxy resin, a phenyl methane type epoxy resin, a tetrakisphenolmethane type epoxy resin, a biphenyl type epoxy resin, an epoxy resin having triazine nuclei as a skeleton thereof, and a bisphenol A-alkylene oxide adduct type epoxy resin. One of these epoxy resins may be used singly, or two or more of these epoxy resins may be used in combination. In addition, an amine resin, an acid anhydride resin, a phenolic resin, imidazoles, and the like may be used as a curing agent. One of these curing agents may be used singly, or two or more of these curing agents may be used in combination. The amount of the curing agent(s) to be blended in an epoxy resin in terms of the equivalent ratio of the curing agent(s) to the epoxy resin is 0.5 to 1.5 in terms of the equivalent ratio, and preferably 0.7 to 1.3 in terms of the equivalent ratio. In this specification, these curing agents are encompassed in the resin.

As the silicone-based resin, a known curable silicone resin which is a mixture of an addition reaction type silicone resin and a silicone-based crosslinking agent can be used without limitation. Examples of the addition reaction type silicone resin include polyorganosiloxane such as polydimethylsiloxane of which the molecule has, as a functional group, an alkenyl group such as a vinyl group and a hexenyl group. Examples of the silicone-based crosslinking agent include polyorganosiloxane having a silicon atom-bonded hydrogen atom, such as dimethylhydrogensiloxy group terminal-blocked dimethylsiloxane-methylhydrogensiloxane copolymer, trimethylsiloxy group terminal-blocked dimethylsiloxane-methylhydrogensiloxane copolymer, trimethylsiloxane group terminal-blocked poly(methylhydrogensiloxane), and poly(hydrogen silsesquioxane). Further, as a curing catalyst, a known curing catalyst such as a platinum-based catalyst used for curing a silicone resin can be used without limitation. Examples of the platinum-based catalyst include particulate platinum, particulate platinum supported on carbon powder, chloroplatinic acid, denatured alcohol chloroplatinic acid, an olefin complex of chloroplatinic acid, palladium, and a rhodium catalyst.

A blend ratio between the resin and the h-BN powder in the resin composition in accordance with an embodiment of the present invention can be appropriately determined according to a purpose of use. For example, the above h-BN powder can be blended so as to account for preferably 30% by volume to 90% by volume, more preferably 40% by volume to 80% by volume, and still more preferably 50% by volume to 70% by volume of the entire resin composition.

(2-2. Another Component)

The resin composition may include a component other than hexagonal boron nitride and a resin. In this specification, such a component is referred to as "another component".

For example, a portion of the h-BN powder in the resin composition may be replaced with an inorganic filler. Examples of the inorganic filler include aluminum oxide, silicon oxide, zinc oxide, magnesium oxide, titanium oxide, silicon nitride, aluminum nitride, aluminum hydroxide, magnesium hydroxide, silicon carbide, calcium carbonate, barium sulfate, and talc.

In addition, the resin composition may include a curing accelerator, a discoloration inhibitor, a surfactant, a dispersing agent, a coupling agent, a colorant, a plasticizer, a viscosity modifier, an antibacterial agent, and the like as necessary, provided that they do not affect the effect of the present invention.

Examples of uses to which the resin composition in accordance with an embodiment of the present invention are put include an adhesive film, a sheet-shaped laminate material (a resin sheet) such as prepreg, a circuit board (to be used for a laminated plate and for a multi-layer printed wiring board), a solder resist, an underfill material, a thermal adhesive, a die bonding material, a semiconductor sealing material, a plugging resin, a resin for embedding components, thermal interface material (a sheet, a gel, grease, and the like), a substrate for power modules, and a heat dissipating member for electronic components.

<3. Resin Sheet>

The resin sheet in accordance with an embodiment of the present invention includes the above resin composition. In other words, the resin sheet is a sheet formed of the resin composition. A thickness of the resin sheet can be appropriately set according to a purpose of use. For example, the thickness may be 20 µm to 200 µm, 20 µm to 100 µm, or 20 µm to 50 µm. A thin resin sheet typically tends to have excellent thermal conductance, but have poor dielectric strength. The resin sheet in accordance with an embodiment of the present invention, which includes the above h-BN powder, is able to have both excellent thermal conductance and excellent dielectric strength even in a case where the resin sheet is relatively thin. A method for forming the resin composition in a sheet shape is not limited to a particular method, and known methods can be used.

A plane orientation index B of the resin sheet is preferably not more than 0.95. The plane orientation index B is calculated from the formula below.

Plane orientation index $B=\log(A/6.67)$

In the formula, A represents a peak ratio between a (002) plane and a (100) plane, which results from the h-BN primary particles and obtained via an XRD measurement, and calculated from the formula below. Note that the peak value resulting from the (002) plane is represented simply as (002), and the peak value resulting from the (100) plane is represented simply as (100).

Peak ratio $A=(002)/(100)$

The resin sheet having a plane orientation index B of not more than 0.95 causes the produced resin sheet to have improved anisotropy and to exhibit good thermal conductance. The plane orientation index B being closer to 0 indicates that the faces of the h-BN primary particle which have high thermal conductance are oriented in a direction more nearly perpendicular to the surface direction of the resin sheet. As used herein, the word "anisotropy" means that, for example, the thermal conductance of the resin sheet in the surface direction is good, whereas the thermal conductance in the thickness direction is poor. Furthermore, the phrase "improvement in anisotropy" indicates that the thermal conductance of the resin sheet in the thickness direction is improved.

A thermal conductivity of the resin sheet as measured in conformity to the temperature wave analysis method (ISO22007-3) is preferably not less than 3.5 W/m·K, and more preferably not less than 4.5 W/m·K. In a case where the resin sheet has a thermal conductivity of not less than 3.5 W/m·K, the resin sheet has good thermal conductance.

A withstand voltage can be used as an indicator of the dielectric strength of the resin sheet. The withstand voltage of the resin sheet as measured in conformity to the thermosetting plastic general test procedures of JIS K6911: 2006, "5.8 withstand voltage (molding material)" is preferably not less than 30 kV/mm, and more preferably not less than 35 kV/mm. In a case where the resin sheet has a withstand voltage of not less than 30 kV/mm, the resin sheet has good insulation.

In addition, in a case where the resin sheet has a thermal conductivity of not less than 3.5 W/m·K and a withstand voltage of not less than 30 kV/mm, the resin sheet has both high thermal conductance and high dielectric strength.

<4. Method for Producing Hexagonal Boron Nitride Powder>

A method for producing h-BN powder in accordance with an embodiment of the present invention includes a heating step of heating mixed powder including an oxide of boron, a nitrogen-containing organic compound, and lithium carbonate. The production method makes it possible to obtain the h-BN powder used for producing the above-described resin sheet which exhibits high thermal conductance and high dielectric strength.

(4-1. Mixed Powder)

Examples of the oxide of boron included in the mixed powder include diboron trioxide (boron oxide), diboron dioxide, tetraboron trioxide, tetraboron pentoxide, borax, and anhydrous borax. In particular, it is preferable to use diboron trioxide. Using, as the oxide of boron, diboron trioxide, which is an inexpensive raw material, is industrially beneficial. Note that two or more kinds of oxides of boron may be used together as the oxide of boron.

Examples of the nitrogen-containing organic compound which is included in the mixed powder include melamine, ammeline, ammelide, melam, melon, dicyandiamide, and urea. In particular, it is preferable to use melamine. Using, as the nitrogen-containing organic compound, melamine, which is an inexpensive raw material, is industrially beneficial. Note that two or more kinds of nitrogen-containing organic compounds may be used together as the nitrogen-containing organic compound.

The lithium carbonate, when molten, becomes a flux which acts as an auxiliary agent for growing the h-BN primary particles. Further, in a case where the lithium carbonate is used, the h-BN primary particle having a specific shape as described above is likely to be produced.

The mixed powder may include alkali carbonate such as calcium carbonate and sodium carbonate, in addition to the oxide of boron, the nitrogen-containing organic compound, and the lithium carbonate.

A weight ratio (B/N) of boron atoms to nitrogen atoms in the mixed powder is preferably not less than 0.2 and not more than 0.4, and more preferably not less than 0.25 and not more than 0.35. The B/N being not less than 0.2 makes it possible to surely provide the source of B, and surely provide a sufficient yield. In addition, the B/N being not more than 0.4 makes it possible to surely provide the source of N which is sufficient for nitriding. Note that nitrogen atoms in the mixed powder to be heated in the heating step are derived from the nitrogen-containing organic compound, and boron atoms in the mixed powder to be heated in the heating step are derived from the oxides of boron.

A weight ratio (B/Li$_2$CO$_3$) of boron atoms to lithium carbonate in the mixed powder is preferably not less than 0.22 and not more than 0.98, and more preferably not less than 0.30 and not more than 0.80. The B/Li$_2$CO$_3$ being not less than 0.22 makes it possible to moderately limit the amount of flux, so that the h-BN primary particles are moderately agglomerated. Further, the B/Li$_2$CO$_3$ being not more than 0.98 makes it possible to form a sufficient amount of flux, and thus yields the h-BN primary particles having a specific shape in a homogeneous manner.

(4-2. Heating Step)

In the heating step, the mixed powder is preferably heated at a maximum temperature of not less than 1200° C. and not more than 1500° C. Heating the mixed powder at a temperature of not less than 1200° C. makes it possible to prevent the h-BN primary particles from having an excessively small particle diameter and from having a high aspect ratio. The maximum temperature is more preferably not less than 1250° C., and still more preferably not less than 1300° C. Heating the mixed powder at a temperature of not more than 1500° C. makes it possible not only to prevent the lithium carbonate from volatilizing but also to prevent the h-BN primary particles from having a large particle diameter and from having a high aspect ratio. The maximum temperature is more preferably not more than 1450° C.

In the heating step, the mixed powder is preferably heated in an inert gas atmosphere and under a normal or reduced pressure environment. Heating the mixed powder under the above environment makes it possible to limit damage to the body of a heating furnace. Note that, as used herein, being in an inert gas atmosphere refers to the state where an inert gas is caused to flow into a vessel for heating the mixed powder so that the inert gas replaces the gas inside the vessel. The flow rate of the inert gas is not limited to a particular rate, and the flow rate of the inert gas may be not less than 5 L/min. Examples of the inert gas include a nitrogen gas, a carbon dioxide gas, and an argon gas.

An example of a preferred technique for the heating step is heating the mixed powder with the mixed powder placed inside a reaction vessel in which gas exchange does not occur during the heating step. In the heating step, the oxides of boron included in the mixed powder are used in a reaction to produce the h-BN powder. However, some of the oxides of boron volatilize due to the heating, and thus are not used for the h-BN powder production reaction. In this circumstance, placing the mixed powder inside the reaction vessel in which gas exchange does not occur during the heating step makes it possible to limit volatilization of the oxides of boron from the mixed powder. This enables increase in the amount of the oxides of boron used for the h-BN powder production reaction, and improvement in yield of the h-BN powder.

As used herein, the phrase "gas exchange does not occur" means that the gas inside the reaction vessel and the gas outside the reaction vessel are not exchanged. In the heating step, a gas generates inside the reaction vessel due to progress of the h-BN powder production reaction and volatilization or decomposition of the mixed powder. Accordingly, what is necessary is to prevent intentional intake of a gas from the outside to the inside of the reaction vessel, and it is not necessary to perfectly prevent the gas inside the reaction vessel from being released to the outside of the reaction vessel.

The characteristics of the reaction vessel such as structure, size, shape, and material are not limited to particular ones, and such characteristics can be determined, in view of production conditions such as a heating temperature and a raw material, so that the reaction vessel has sufficient durability, heat resistance, pressure resistance, corrosion resistance, and the like.

Examples of a mechanism for preventing gas exchange from occurring include a lidded reaction vessel to be used as the reaction vessel. Since a lidded reaction vessel is separated from the outside by a lid, it is possible to prevent a gas from flowing into the reaction vessel from the outside, so that gas exchange does not occur.

In a case where the reaction vessel is completely sealed, the inside pressure of the vessel increases due to gas generation caused by progress of the h-BN powder production reaction and by volatilization or decomposition of the mixed powder, or due to gas expansion in the reaction vessel by heating. In this case, the reaction vessel could be damaged, or limitations on the material and shape of the reaction vessel can arise to make the reaction vessel pressure-proof. Accordingly, it is preferable to appropriately release an excessive amount of gas inside the reaction vessel to the extent that does not greatly affect the yield of the h-BN powder.

Example of a method for releasing an excessive amount of gas inside the reaction vessel include a method of providing a pressure regulating valve to the reaction vessel, and a method of making a small hole in the reaction vessel.

In addition, in a case where the reaction vessel is a lidded vessel, disposing a lid on top of the reaction vessel such that the lid rests on the vessel without any particular fixation causes, when the inside pressure of the vessel is low, the reaction vessel to be sealed with the lid under the weight of the lid, and causes, when the inside pressure of the vessel increases, the lid to be lifted up so that the gas inside the reaction vessel is emitted to the outside. Accordingly, providing the lidded vessel makes it possible not only to easily prevent gas exchange from occurring but also to release an excessive amount of gas inside the reaction vessel, and thus is a preferred embodiment. In this case, the weight of the lid per unit area preferably ranges from 5 kg/m$^2$ to 20 kg/m$^2$. Note that the weight of the lid per unit area is a value obtained by dividing the weight of the lid by the area of a surface of the lid that faces the inside space of the reaction vessel.

The shape of the reaction vessel is not limited to a specific shape, and any shape, such as a cylindrical shape and a rectangular shape, can be used. The shape of the reaction vessel is preferably a cylindrical shape in terms of prevention of damage to the reaction vessel due to repeated heating and cooling, or preferably a rectangular shape in terms of improvement in production efficiency by effectively using the space inside a heating furnace in which the vessel is installed.

The material of the reaction vessel is not limited to a particular material provided that the material withstands a temperature of not less than 1200° C. and not more than 1500° C., i.e. the heating temperature in the heating step. Examples of the material of the reaction vessel include various kinds of ceramic sintered bodies such as alumina, titania, zirconia, silica, magnesia and calcia, and cordierite and mullite each containing, as a major constituent, silica and alumina. Alternatively, using boron nitride as the material of the reaction vessel is a preferred embodiment in terms of preventing the h-BN powder, which is the reaction product, from being contaminated. Further, covering, with boron nitride, the inner surface of the reaction vessel (the surface with which the mixed powder and produced h-BN powder come into contact) which is made of a material other than boron nitride can be a preferred embodiment.

The amount of the mixed powder to be placed inside the reaction vessel is not limited to a particular amount. However, in a case where the amount of the mixed powder placed inside the reaction vessel is too small, a gas phase part constitutes a large part of the reaction vessel. This causes failure to sufficiently limit volatilization of the oxides of boron, and results in limited yield improvement. On the other hand, in a case where the amount of the mixed powder is too large, the gas phase part constitutes a small part of the reaction vessel, and the inside pressure of the reaction vessel is likely to increase. Therefore, a volume occupied by the mixed powder in the reaction vessel is preferably in the range of 50% to 90%, and still more preferably in the range of 60% to 80%, with respect to the volume of the reaction vessel. Note that, as used herein, the volume occupied by the mixed powder refers to a volume of the part occupied by the mixed powder that includes voids between particles which are left when the mixed powder is put into the reaction vessel.

Although the method for heating the mixed powder placed inside the reaction vessel in which gas exchange does not occur is not limited to a particular method, heating the mixed powder at a desired temperature with the reaction vessel installed in a heating furnace is a preferred embodiment because of convenience of the implementation.

(4-3. Other Steps)

The method for producing the h-BN powder may include steps other than the heating step. In this specification, such steps are referred to as "other steps". Such other steps included in the method for producing the h-BN powder include, for example, a mixing step, an acid cleaning step, a water cleaning step, a drying step, and a classifying step.

The mixing step is a step of mixing an oxide of boron, a nitrogen-containing organic compound, lithium carbonate, and other components before the heating step. Mixing the components of the mixed powder in advance causes the reaction to proceed in a substantially uniform manner. This reduces variation in characteristics including the particle diameter of the produced h-BN primary particle.

The acid cleaning step is a step of removing, by cleaning the h-BN powder with acid, lithium carbonate, boron oxide, a complex oxide of lithium carbonate and boron oxide, or the like which has been attached to the h-BN powder. In the acid cleaning step, it is preferable to use dilute acid such as hydrochloric acid. The acid cleaning method is not limited to a particular method, and may be acid cleaning through showering, acid cleaning through soakage, or acid cleaning through a stir.

The water cleaning step is a step of cleaning the h-BN powder with water to remove acids which have been attached to the h-BN powder in the acid cleaning step. The water cleaning method is not limited to a particular method, and may be water cleaning through showering or water cleaning through soakage after the h-BN powder is separated by filtering.

The drying step is a step of drying the produced h-BN powder. The drying method, which is not limited to a particular method, is, for example, high temperature drying or reduced-pressure drying.

The classifying step is a step of classifying the h-BN powder according to, for example, a size of the particle and/or a shape of the particle. The classifying operation may be sieve classification, or may be wet classification or airflow classification.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

[1] Hexagonal boron nitride powder including hexagonal boron nitride agglomerate particles each including agglomerated hexagonal boron nitride primary particles, the hexagonal boron nitride powder having a specific surface area of not less than 0.5 m$^2$/g and not more than 5.0 m$^2$/g, and the hexagonal boron nitride primary particles each having a long diameter of not less than 0.6 μm and not more than 4.0 μm and an aspect ratio of not less than 1.5 and not more than 5.0.

[2] The hexagonal boron nitride powder described in [1], wherein the hexagonal boron nitride powder has a tapped bulk density of not less than 0.40 g/cm$^3$.

[3] The hexagonal boron nitride powder described in [1] or [2], wherein the hexagonal boron nitride powder has a D95, as measured via a particle size distribution measurement, of 5 μm to 15 μm.

[4] A resin composition including hexagonal boron nitride powder described in any one of [1] to [3], and a resin.

[5] A resin sheet including a resin composition described in [4], the resin sheet having a plane orientation index B=log(A/6.67) of not more than 0.95, the plane orientation index calculated from a peak ratio A=(002)/(100) between a (002) plane and a (100) plane, and the peak ratio obtained via an XRD measurement and resulting from the hexagonal boron nitride primary particles.

[6] A method for producing hexagonal boron nitride powder including a heating step of heating mixed powder including an oxide of boron, a nitrogen-containing organic compound, and lithium carbonate, a weight ratio of boron atoms to nitrogen atoms in the mixed powder being not less than 0.2 and not more than 0.4, a weight ratio of boron atoms to the lithium carbonate in the mixed powder being not less than 0.22 and not more than 0.98, and the mixed powder being heated at a maximum temperature of not less than 1200° C. and not more than 1500° C. in the heating step.

[7] The method for producing hexagonal boron nitride powder described in [6], wherein the heating step is carried out with the mixed powder placed inside a reaction vessel in which gas exchange does not occur in the heating step.

EXAMPLES

The following description will discuss an example of the present invention.

[Method for Estimating h-BN Primary Particle]
<Long Diameter and Aspect Ratio>

The long diameter and the aspect ratio of the h-BN primary particle were measured using an FE-SEM (available from Hitachi High-Technologies Corporation: S5500). One hundred different h-BN primary particles were randomly selected in a scanning electron microscopic observation image at a magnification of 5000, and lengths of the long diameters and thicknesses of the respective h-BN primary particles were measured so that aspect ratios (which are each the length of the long diameter/the length of the thickness) of the respective h-BN primary particles were calculated. The average value for the aspect ratios was defined as the aspect ratio. The length of the long diameter was determined by calculating the average value for the measured values.

[Method for Estimating h-BN Powder]
<Specific Surface Area>

The specific surface area of the h-BN powder was measured using Macsorb HM model-1201 available from Mountech Co., Ltd.

<Thermal Conductivity>

The thermal conductivity (W/m·K) of the resin sheet was determined by using the formula, thermal diffusivity (m$^2$/second)×density (kg/m$^3$)×specific heat (J/kg·K).

The thermal diffusivity was measured using the temperature wave analysis method (ai-Phase Mobile u: available from ai-Phase Co. Ltd., ISO22007-3), the density was measured using the Archimedes method (XS204V: available from Mettler-Toledo), and the specific heat was measured using the differential scanning calorimeter (DSC) method (Thermo Plus Evo DSC8230: available from Rigaku Corporation).

<Withstand Voltage>

The withstand voltage (kV/mm) of the resin sheet was measured by using a withstand voltage tester, YPAD-0225 available from KYONAN ELECTRIC CO., LTD, and in conformity to JIS K6911: 2006, Testing method for thermosetting plastics, "5.8 withstand voltage (molding material)".

<Plane Orientation Index>

The plane orientation index of the resin sheet was measured using an XRD. SmartLab, which is a fully automatic horizontal multipurpose X-ray diffractometer available from Rigaku Corporation, was used as the measuring device. The measurement conditions were such that a scanning speed was 20 degrees/min, a step width was 0.02 degrees, and a scanning range was 10 degrees to 90 degrees.

<Particle Size Distribution>

The particle size distribution of the h-BN powder was measured using a particle diameter distribution measuring device, MT3000, available from Nikkiso Co., Ltd. Note that measurement samples were prepared by a method indicated below. First, 20 g of ethanol was put, as a dispersion medium, in a 50 mL screw top vial, and 1 g of h-BN powder was dispersed in the ethanol. Next, ultrasonic treatment was performed for 20 minutes at an amplitude of 40% using an ultrasonic homogenizer (SONIFIER SFX250) available from BRANSON with the tip of the ultrasonic homogenizer installed at 10 mm above the bottom of the screw top vial. Then, a particle size distribution was measured for the measurement samples which were subjected to the ultrasonic treatment.

<Tapped Bulk Density>

The tapped bulk density of the h-BN powder was measured using Tap Denser KYT-5000 available from SEISHIN ENTERPRISE CO., LTD. A 100 mL sample cell was used. The measurement conditions were such that a tap speed was 120 times/min, a tap height was 5 cm, and the number of taps was 500.

<Filled Resin Viscosity>

With regard to a resin composition produced by filling a silicone resin (CY52-276A available from Dow Toray Co., Ltd.) with 20% by volume of the h-BN powder, the viscosity of the resin composition was measured using a rheometer (AR2000ex available from TA Instruments, Inc.) at a measurement temperature of 25° C. and a shear rate of 1/S. The viscosity thus measured was used as the filled resin viscosity.

<DBP Absorption>

The DBP absorption (mL/100 g) of the h-BN powder calculated from a curve obtained from a horizontal axis: a DBP drip amount (mL) and a vertical axis: torque (Nm) as measured in conformity to JIS-K-6217-4 was determined. As a measuring device, S-500 available from ASAHI-SOUKEN CORPORATION was used. The measurement condition was such that a DBP drip rate was 4 mL/min, the number of rotations of the stirring blade was 125 rpm, an amount of the sample introduced was 15 g to 25 g, and the DBP absorption was determined using the drip amount of 70% of the maximum torque. The special grade chemical (manufacturer code: 021-06936) which is available from Wako Pure Chemical Industries, Ltd. was used for the Dibutyl Phthalate (DBP).

Example 1

First, mixed powder was produced by mixing 14.6 g of boron oxide as an oxide of boron, 24 g of melamine as a nitrogen-containing organic compound, and 10.4 g of lithium carbonate. The B/N of the produced mixed powder was 0.28, and the $B/Li_2CO_3$ of the produced mixed powder was 0.44.

In the heating step, the produced mixed powder was heated in a nitrogen atmosphere at a maximum temperature of 1400° C. for one hour using a batch-type baking furnace, so that the h-BN powder was produced. After subjected to acid cleaning with 5% hydrochloric acid solution, the produced h-BN powder was separated by filtering, and subjected to water cleaning and drying. FIG. 1 is a view illustrating a scanning electron microscope image of the h-BN powder in accordance with Example 1, in which (a) of FIG. 1 is a view of an image captured at a magnification of 2000, (b) of FIG. 1 is a view of an image captured at a magnification of 5000, and (c) of FIG. 1 is a view of an image captured at a magnification of 10000.

A mixture of 100 parts by weight of an epoxy resin (JER806 available from Mitsubishi Chemical Corporation) and 28 parts by weight of a curing agent (alicyclic polyamine curing agent, JERCURE113 available from Mitsubishi Chemical Corporation) was prepared as a base material resin.

Next, after 40% by volume of the base material resin and 60% by volume of the produced h-BN powder were mixed using, as a solvent, methyl ethyl ketone, the solvent was dried and solidified. A resin composition was thus obtained.

The dried and solidified resin composition was injected into a mold, and the injected resin composition was cured using heat press under conditions where the heating temperature was 150° C., the pressure was 5 MPa, and the holding time was one hour. A sheet having a diameter of 10 mm and a thickness of 0.15 mm was thus produced.

Example 2

Figure 2:
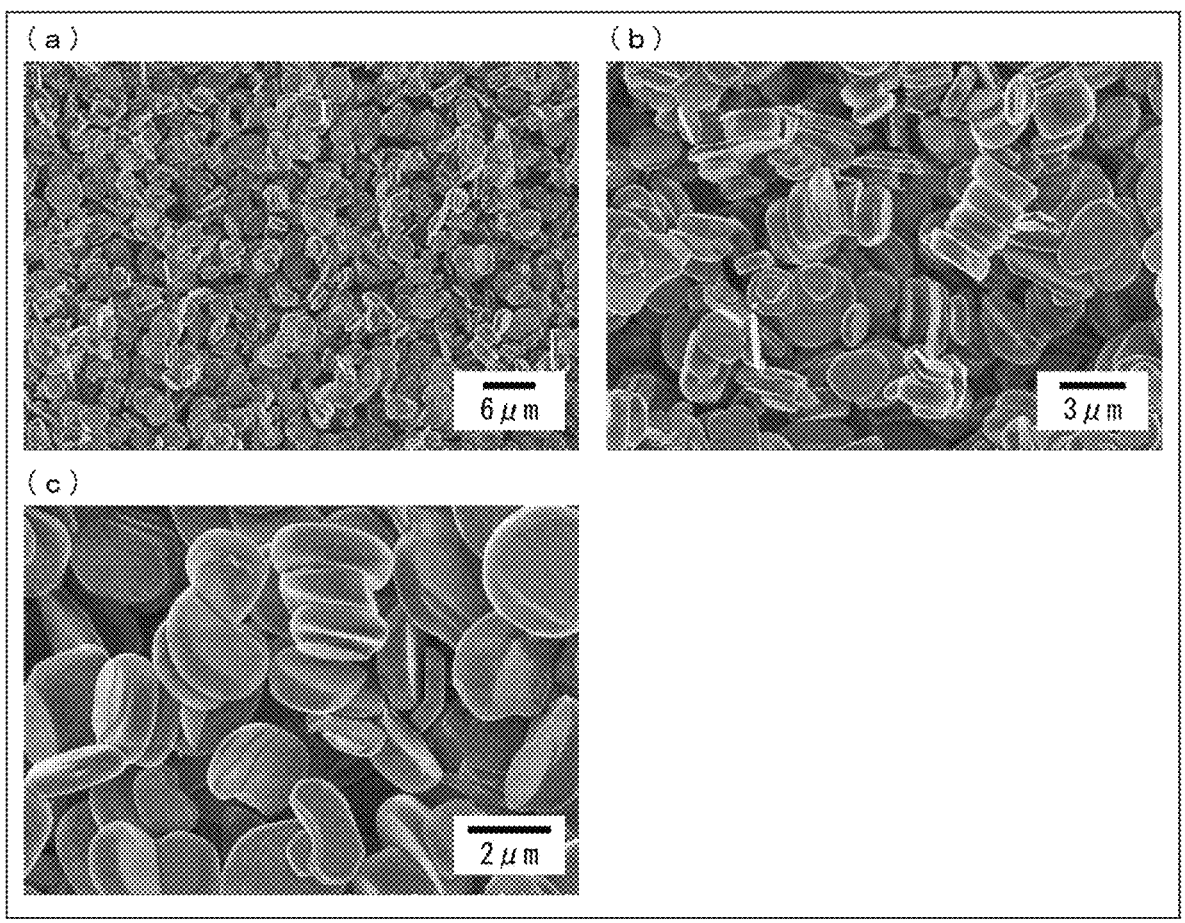
FIG. 2 is a view illustrating a scanning electron microscope image of hexagonal boron nitride powder in accordance with Example 2, in which (a) of FIG. 2 is a view of an image captured at a magnification of 2000, (b) of FIG. 2 is a view of an image captured at a magnification of 5000, and (c) of FIG. 2 is a view of an image captured at a magnification of 10000.

By a method similar to that of Example 1, except that the maximum temperature in the heating step was 1500° C., h-BN powder, a resin composition, and a resin sheet were produced. FIG. 2 is a view illustrating a scanning electron microscope image of the h-BN powder in accordance with Example 2, in which (a) of FIG. 2 is a view of an image captured at a magnification of 2000, (b) of FIG. 2 is a view of an image captured at a magnification of 5000, and (c) of FIG. 2 is a view of an image captured at a magnification of 10000.

Example 3

In the heating step, the produced mixed powder was put into a lidded reaction vessel which has a lid on top of the reaction vessel and in which gas exchange does not occur. The lidded reaction vessel measures an inside dimension of 170 mm×170 mm by a height of 30 mm (volume 867000 mm$^3$), and the weight of the lid is 300 g (the weight of the lid per unit area: 0.0104 g/mm$^2$). Then, h-BN powder was produced by a method similar to Example 1, except that the lidded reaction vessel into which the mixed powder was put was heated with the lidded reaction vessel placed in a batch-type baking furnace. Note that the volume of the mixed powder inside the lidded reaction vessel was 578000 mm$^3$, and the volume occupied by the mixed powder in the lidded reaction vessel was 67%.

Comparative Example 1

As Comparative Example 1, mixed powder was produced by mixing 14.6 g of boron oxide as an oxide of boron, 40 g of melamine as a nitrogen-containing organic compound, and 10.4 g of lithium carbonate. The produced mixed powder had a B/N of 0.17, and a $B/Li_2CO_3$ of 0.44. By a method similar to Example 2, except the amount of melamine was larger, h-BN powder, a resin composition, and a resin sheet were produced.

Comparative Example 2

As Comparative Example 2, mixed powder is produced by mixing 14.6 g of boron oxide as an oxide of boron, 12.3 g of melamine as a nitrogen-containing organic compound, and 10.4 g of lithium carbonate. The produced mixed powder had a B/N of 0.55 and a B/Li₂CO₃ of 0.44. By a method similar to that of Example 2, except that the amount of melamine was smaller, h-BN powder, a resin composition, and a resin sheet were produced.

Comparative Example 3

As Comparative Example 3, mixed powder was produced by mixing 14.6 g of boron oxide as an oxide of boron, 24 g of melamine as a nitrogen-containing organic compound, and 3.76 g of lithium carbonate. The produced mixed powder had a B/N of 0.28 and a B/Li₂CO₃ of 1.22. By a method similar to that of Example 2, except that the amount of lithium carbonate was smaller, h-BN powder, a resin composition, and a resin sheet were produced.

Comparative Example 4

As Comparative Example 4, mixed powder was produced by mixing 14.6 g of boron oxide as an oxide of boron, 24 g of melamine as a nitrogen-containing organic compound, and 25 g of lithium carbonate. The produced mixed powder had a B/N of 0.28 and a B/Li₂CO₃ of 0.18. By a method similar to Example 2, except the amount of lithium carbonate was larger, h-BN powder, a resin composition, and a resin sheet were produced.

Comparative Example 5

As Comparative Example 5, h-BN powder, a resin composition, and a resin sheet were produced by a method similar to that of Example 1, except that the maximum temperature in the heating step was changed to 1100° C.

Comparative Example 6

As Comparative Example 6, h-BN powder, a resin composition, and a resin sheet were produced by a method similar to that of Example 1, except that the maximum temperature at the heating step was changed to 1600° C.

Comparative Example 7

Figure 3:
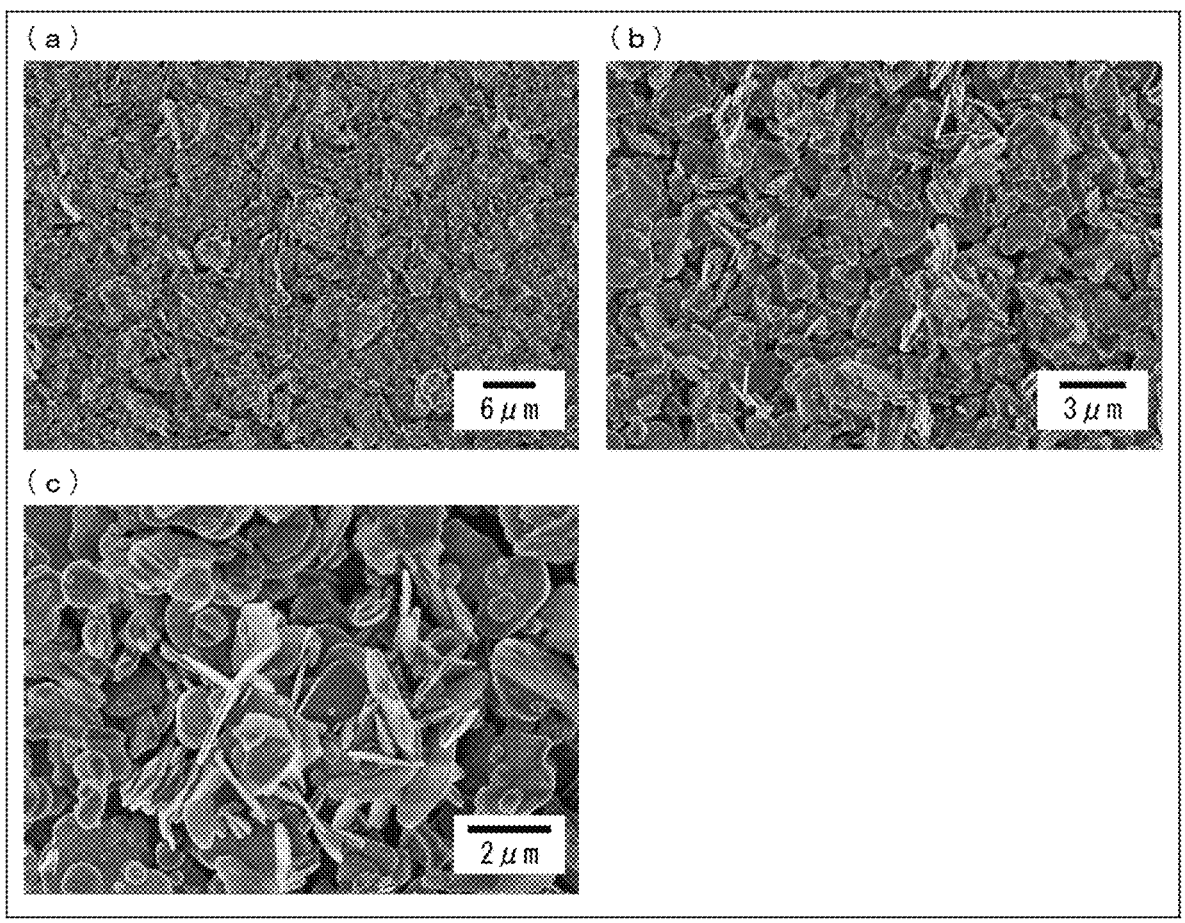
FIG. 3 is a view illustrating of a scanning electron microscope image of hexagonal boron nitride powder in accordance with Comparative Example 7, in which (a) of FIG. 3 is a view of an image captured at a magnification of 2000, (b) of FIG. 3 is a view of an image captured at a magnification of 5000, and (c) of FIG. 3 is a view of an image captured at a magnification of 10000.

A resin composition and a resin sheet were produced by a method similar to that of Example 1, except that the h-BN powder was changed to AP-10S available from MARUKA CORPORATION, Ltd. FIG. 3 is a view illustrating of a scanning electron microscope image of the h-BN powder in accordance with Comparative Example 7, in which (a) of FIG. 3 is a view of an image captured at a magnification of 2000, (b) of FIG. 3 is a view of an image captured at a magnification of 5000, and (c) of FIG. 3 is a view of an image captured at a magnification of 10000.

Comparative Example 8

Figure 4:
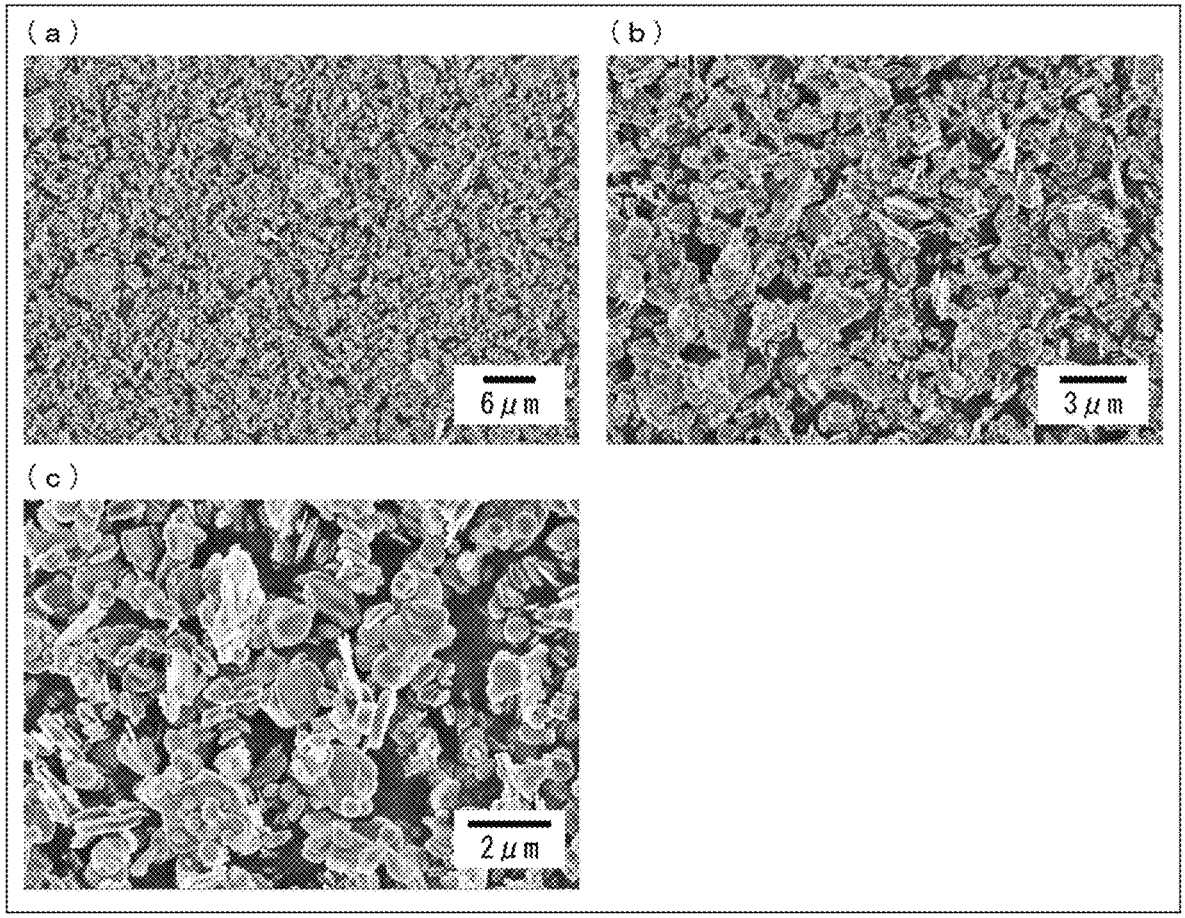
FIG. 4 a view illustrating a scanning electron microscope image of hexagonal boron nitride powder in accordance with Comparative Example 8, in which (a) of FIG. 4 is a view of an image captured at a magnification of 2000, (b) of FIG. 4 is a view of an image captured at a magnification of 5000, and (c) of FIG. 4 is a view of an image captured at a magnification of 10000.
Figure 5:
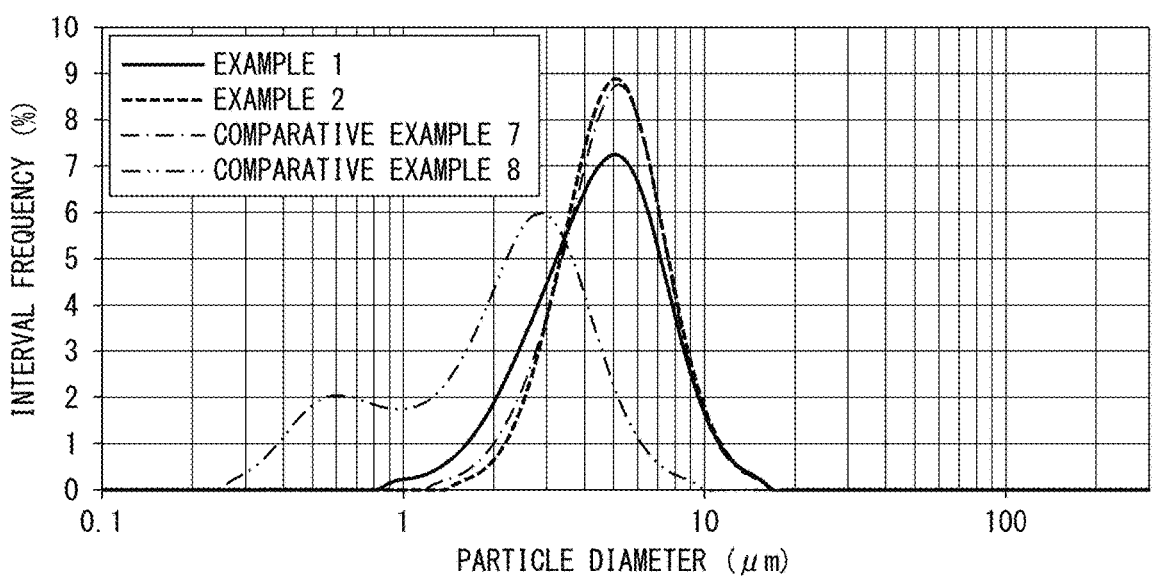
FIG. 5 is a view illustrating graphs of particle size distributions of hexagonal boron nitride powder in accordance with Examples 1 and 2 and Comparative Examples 7 and 8.

A resin composition and a resin sheet were produced by a method similar to that of Example 1, except that the h-BN powder was changed to RBN available from NISSHIN REFRATECH CO., LTD. FIG. 4 a view illustrating a scanning electron microscope image of the hexagonal boron nitride powder in accordance with Comparative Example 8, in which (a) of FIG. 4 is a view of an image captured at a magnification of 2000, (b) of FIG. 4 is a view of an image captured at a magnification of 5000, and (c) of FIG. 4 is a view of an image captured at a magnification of 10000.

[Results]

Tables 1 to 3 illustrate the production conditions, physical properties, and others of the h-BN powder and the resin sheets. In addition, Table 4 illustrates yields of the h-BN powder. Each yield was calculated as a ratio of an amount of the actually obtained h-BN powder to a production amount of h-BN which is calculated from an amount of boron atoms in the mixed powder which is a raw material.

TABLE 1

|  | Maximum Temperature (° C.) | B/N | B/Li₂CO₃ | h-BN Primary Particle Long Diameter (µm) | Aspect Ratio |
|---|---|---|---|---|---|
| Example 1 | 1400 | 0.28 | 0.44 | 1.8 | 3.3 |
| Example 2 | 1500 | 0.28 | 0.44 | 3.4 | 4.0 |
| Example 3 | 1400 | 0.28 | 0.44 | 2.1 | 3.5 |
| Comparative Example 1 | 1500 | 0.17 | 0.44 | 4.2 | 4.0 |
| Comparative Example 2 | 1500 | 0.55 | 0.44 | 2.8 | 5.3 |
| Comparative Example 3 | 1500 | 0.28 | 1.20 | 2.2 | 10.2 |
| Comparative Example 4 | 1500 | 0.28 | 0.18 | 4.3 | 3.8 |
| Comparative Example 5 | 1100 | 0.28 | 0.44 | 0.4 | 5.2 |
| Comparative Example 6 | 1600 | 0.28 | 0.44 | 5.4 | 8.4 |
| Comparative Example 7 | — | — | — | 3.0 | 10.2 |
| Comparative Example 8 | — | — | — | 0.7 | 4.5 |

TABLE 2

|  | h-BN Powder | | | | | | |
|---|---|---|---|---|---|---|---|
|  | Specific Area (m²/g) | Tapped Bulk Density (g/cm³) | DBP Absorption (mL/100 g) | D10 (µm) | D50 (µm) | D90 (µm) | D95 (µm) |
| Example 1 | 2.9 | 0.59 | 53 | 2.2 | 4.4 | 7.7 | 9.0 |
| Example 2 | 1.8 | 0.58 | 56 | 2.8 | 4.7 | 7.9 | 9.1 |
| Example 3 | 3.9 | 0.55 | 57 | 2.8 | 6.5 | 11.3 | 13.4 |
| Comparative Example 1 | 1.6 | 0.32 | 70 | 2.3 | 5.2 | 7.8 | 8.8 |
| Comparative Example 2 | 2.7 | 0.58 | 62 | 1.8 | 5.3 | 8.2 | 12.2 |
| Comparative Example 3 | 5.2 | 0.60 | 60 | 2.3 | 7.2 | 8.8 | 13.8 |
| Comparative Example 4 | 1.5 | 0.34 | 68 | 2.4 | 5.1 | 8.2 | 10.2 |
| Comparative Example 5 | 9.2 | 0.43 | 62 | 1.5 | 3.8 | 10.2 | 16.2 |
| Comparative Example 6 | 1.3 | 0.45 | 67 | 3.4 | 6.3 | 10.2 | 16.8 |
| Comparative Example 7 | 6.9 | 0.35 | 80 | 2.7 | 4.7 | 7.7 | 8.9 |
| Comparative Example 8 | 10.4 | 0.36 | 59 | 0.6 | 2.2 | 4.2 | 5.0 |

TABLE 3

|  | Thermal Conductivity (W/m · K) | Dielectric Strength (kV/mm) | Filled Resin Viscosity (Pa · S) | Plane Orientation Index |
|---|---|---|---|---|
| Example 1 | 5.1 | 32 | 120 | 0.5 |
| Example 2 | 3.9 | 35 | 45 | 0.9 |
| Comparative Example 1 | 2.8 | 36 | 43 | 1.1 |

TABLE 3-continued

|  | Thermal Conductivity (W/m · K) | Dielectric Strength (kV/mm) | Filled Resin Viscosity (Pa · S) | Plane Orientation Index |
|---|---|---|---|---|
| Comparative Example 2 | 3.9 | 26 | 140 | 1.0 |
| Comparative Example 3 | 4.2 | 22 | 150 | 1.0 |
| Comparative Example 4 | 2.7 | 33 | 44 | 1.2 |
| Comparative Example 5 | 2.7 | 38 | 380 | 1.0 |
| Comparative Example 6 | 2.8 | 37 | 40 | 1.3 |
| Comparative Example 7 | 3.2 | 25 | 250 | 1.0 |
| Comparative Example 8 | 2.8 | 47 | 560 | 1.0 |

TABLE 4

|  | h-BN Powder Yield (%) |
|---|---|
| Example 1 | 56.6% |
| Example 3 | 72.9% |

Examples 1 to 3 yielded h-BN primary particles each having a long diameter and an aspect ratio which fall within respective particular ranges, and h-BN powder having a specific surface area which falls within a particular range. Further, both the h-BN powder produced in Example 1 and the h-BN powder produced in Example 2 had a low filled resin viscosity, so that a resin is considered to be densely filled with the h-BN powder. In addition, the resin sheet exhibited a plane orientation index of not more than 0.95, and thus had an improved anisotropy. Furthermore, the resin sheets produced in Example 1 and Example 2 had good thermal conductance and good dielectric strength. From the above, it is understood that it is possible to obtain a resin sheet which exhibits high thermal conductance and high dielectric strength by using the h-BN powder that includes the h-BN agglomerate particles each including agglomerated h-BN primary particles each having a long diameter and an aspect ratio which fall within respective particular ranges, and that has a specific surface area falling within a particular range.

Comparison of Example 1 with Example 3 shows that Example 3, in which the mixed powder was placed, in the heating step, inside the reaction vessel in which gas exchange does not occur, enabled h-BN production at a higher yield than Example 1, which did not use the reaction vessel in which gas exchange does not occur.

The production method of Comparative Example 1, which had a lower B/N than Example 2, resulted in a long diameter of the h-BN primary particle longer than that of Example 2. In addition, the h-BN powder of Comparative Example 1 had a low tapped bulk density, and thus is considered to have a poor filling property. A resin sheet obtained using such h-BN powder had a plane orientation index of more than 0.95 and had anisotropy. The resin sheet had a poor thermal conductance.

The production method of Comparative Example 2, which had a higher B/N than Example 2, resulted in an aspect ratio of the h-BN primary particle larger than that of Example 2. In addition, the h-BN powder of Comparative Example 2 had a high resin filled density, and thus is considered to have a poor filling property. A resin sheet obtained using such h-BN powder had a plane orientation index of more than 0.95 and had anisotropy. The resin sheet had a poor dielectric strength.

The production method of Comparative Example 3, which had a higher $B/Li_2CO_3$ than Example 2, resulted in an aspect ratio of the h-BN primary particle larger than that of Example 2. In addition, the h-BN powder of Comparative Example 3 had a large specific surface area and high resin filled density, and thus is considered to have a poor filling property. A resin sheet obtained using such h-BN powder had a plane orientation index of more than 0.95 and had anisotropy. The resin sheet had a poor dielectric strength.

The production method of Comparative Example 4, which had a lower $B/Li_2CO_3$ than Example 2, resulted in a long diameter of the h-BN primary particle longer than that of Example 2. In addition, the h-BN powder of Comparative Example 4 had a low tapped bulk density, and thus is considered to have a poor filling property. A resin sheet obtained using such h-BN powder had a plane orientation index of more than 0.95 and had anisotropy. The resin sheet had a poor thermal conductance.

The production method of Comparative Example 5, which was heated at a lower maximum temperature in the heating step than Example 2 was, resulted in a long diameter of the h-BN primary particle shorter than that of Example 2, and resulted in an aspect ratio of the h-BN primary particle larger than that of Example 2. In addition, the h-BN powder of Comparative Example 5 had a large specific surface area, a large D95 and a high resin filled density, and thus is considered to have a poor filling property. A resin sheet obtained using such h-BN powder had a plane orientation index of more than 0.95 and had anisotropy. The resin sheet had a poor thermal conductance.

The production method of Comparative Example 6, which was heated at a higher maximum temperature in the heating step than Example 2 was, resulted in a long diameter of the h-BN primary particle longer than that of Example 2, and resulted in an aspect ratio of the h-BN primary particle larger than that of Example 2. In addition, the h-BN powder of Comparative Example 6 had a low tapped bulk density and a large D95, and thus is considered to have a poor filling property. A resin sheet obtained using such h-BN powder had a plane orientation index of more than 0.95 and had anisotropy. The resin sheet had a poor thermal conductance.

In Comparative Example 7, AP-10S available from MARUKA CORPORATION, Ltd., which has a large aspect ratio and a large specific surface area, had a high filled resin viscosity, and thus is considered to have a poor filling property. A resin sheet obtained using such h-BN powder had a plane orientation index of more than 0.95 and had anisotropy. The resin sheet had a poor thermal conductance and a poor dielectric strength.

In Comparative Example 8, RBN available from NISSHIN REFRATECH CO., LTD., which has a large specific surface area and a small tapped bulk density, had a high filled resin viscosity, and thus is considered to have a poor filling property. A resin sheet obtained using such h-BN powder had a plane orientation index of more than 0.95 and had anisotropy. The resin sheet had a poor thermal conductance.

INDUSTRIAL APPLICABILITY

The present invention can be used for electronic components having excellent thermal conductance and excellent dielectric strength.

The invention claimed is:

1. A hexagonal boron nitride powder, comprising hexagonal boron nitride agglomerate particles each including agglomerated hexagonal boron nitride primary particles, the hexagonal boron nitride powder having a specific surface area of not less than 0.5 m$^2$/g and not more than 5.0 m$^2$/g, and the hexagonal boron nitride primary particles each having a long diameter of not less than 0.6 μm and not more than 4.0 μm and an aspect ratio of not less than 1.5 and not more than 4.0, wherein the hexagonal boron nitride powder has a D95, as measured via a particle size distribution measurement, of 5 μm to 15 μm.

2. The hexagonal boron nitride powder according to claim 1, wherein the hexagonal boron nitride powder has a tapped density of not less than 0.40 g/cm$^3$.

3. A resin composition, comprising:

hexagonal boron nitride powder according to claim 1; and a resin.

4. A resin sheet, comprising a resin composition according to claim 3, the resin sheet having a plane orientation index B=log(A/6.67) of not more than 0.95, the plane orientation index B calculated from a peak ratio A=(002)/(100) between a (002) plane and a (100) plane, and the peak ratio obtained via an XRD measurement and resulting from hexagonal boron nitride primary particles.

* * * * *